Feb. 5, 1935.  R. K. WINNING  1,989,961
CONTROL DEVICE
Filed July 22, 1932
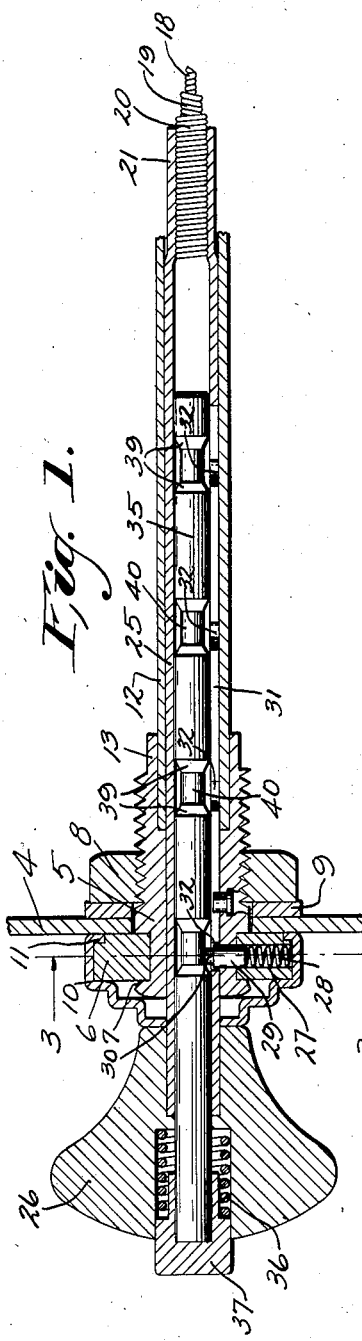
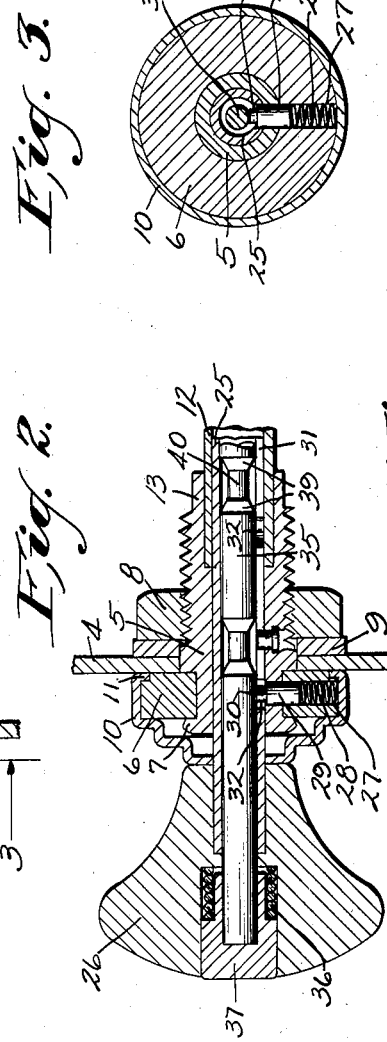
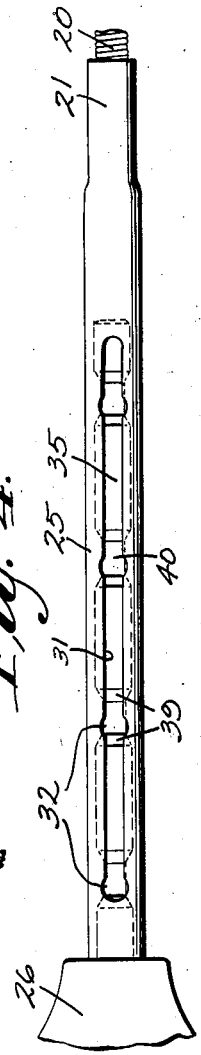
Inventor
Robert K. Winning
By
Whaley, Whaley and Whaley
Attorneys Patented Feb. 5, 1935

1,989,961

UNITED STATES PATENT OFFICE 1,989,961

CONTROL DEVICE

Robert K. Winning, Wauwatosa, Wis., assignor to Clum Manufacturing Company, Milwaukee, Wis., a corporation of Wisconsin Application July 22, 1932, Serial No. 623,932

4 Claims. (Cl. 74—503)

This invention relates to improvements in control devices.

The present application is a companion to my co-pending application Serial No. 593,675, filed February 17, 1932, and entitled Control devices.

It is the object of the present invention to provide an improved structure wherein the detent and guide means are combined, thereby reducing the number of parts required and strengthening the assembly by the elimination of apertures used in the construction previously employed.

In the drawing:

Figure 1 is a vertical axial section through a device embodying the present invention.

Figure 2 is a fragmentary detail in axial section showing the parts in different position from those in which they appear in Figure 1.

Figure 3 is a detail view taken in section in the plane indicated at 3—3 in Figure 1.

Figure 4 is a detail view in bottom plan of the tubular operating shaft.

Like parts are identified by the same reference characters throughout the several views.

A support typical of the usual instrument panel is illustrated at 4 and is provided with an aperture through which extends the threaded plug 5 upon the reduced extremity of which disk 6 is held by upsetting the material of the plug as shown at 7. The disk 6 constitutes a head for the plug which is held in clamping engagement with dash 4 by means of nut 8 and an interposed washer 9. The device is exteriorly finished by means of a stamped shell 10, apertured in registry with the tubular bore through plug 5 and having its marginal portions 11 formed about the margin of the head or disk 6.

The plug 5 serves as a mounting for a tubular barrel 12 upon which the inner end portion 13 of the plug is sleeved and compressed to retain the parts in assembly. A tubular control rod 25 is reciprocable within the barrel 12 and projects therefrom through the bore of plug 5 and the registering aperture of the finishing plate or shell 10. To its outer end is fixed a knob 26 whereby the control rod may be reciprocated. Its reciprocation is transmitted to a Bowden wire element. While any desired type of Bowden wire element may be used, it is preferred that the Bowden wire be a composite structure made up of three plies of piano wire, alternately wound helically in opposite directions, as shown at 18, 19, and 20. Each ply includes a number of strands of wire wound together. Upon this composite structure the end of tube 25 is compressed at 21 to reciprocate the composite Bowden wire through any desirable flexible sheath. The use of several plies alternately wound in opposite directions makes the reciprocable element of the Bowden wire very strong and yet sufficiently flexible to transmit motion through a sheath of any curvature normally found in practice.

Detent means are used for fixing one or more predetermined positions of the control rod and its associated parts and for simultaneously securing the control rod against angular or rotative displacement independently of cooperative guiding means which may or may not be employed. A radial bore 27 in disk 6 receives a compression spring 28 acting upon plunger 29, having a reduced terminal pin portion 30. The control rod 25 has a longitudinal slot at 31, enlarged at 32 to provide longitudinally spaced cylindrical apertures into which the plunger 29 is receivable, the pin 30 being receivable into all portions of slot 31 under compression of the spring 28. The pin at all times confines the control shaft 25 against angular displacement and the plunger itself, when engaged in one of the apertures 32, positively locks the shaft against axial movement. In addition, the plunger 29 serves to key the disk 6 to plug 5.

To release the detent I provide at 35 a release pin extending axially within the tubular control rod and normally held in a retracted position by compression spring 36, acting on push button 37 which is attached to the end of this pin. The release pin is provided opposite each of the apertures 32 with beveled shoulders 39 leading to peripheral grooves 40 at such depth as to receive the pin 30. When the push button 37 is pressed inwardly by the operator against the compression of spring 36 the beveled surfaces 39 move across apertures 32 and act as cams on pin 30 to force out of said apertures the plunger 29 engaged therein.

The operation of the device is the same regardless of the particular aperture with which the plunger may be engaged at the time. Figure 2 shows how the release pin 35, in its extreme position, has lifted pin 30 and expelled the plunger 29 from aperture 32. The number of detent positions of this device may be varied at will by varying the number of apertures and by providing a corresponding number of grooves on the control pin 35.

The fact that a single member, the plunger 29, functions as a detent pin and as a key to secure the control rod against angular displacement not only reduces expense of parts and cost of assembly but also strengthens the construction, since only one slot in the tubular control rod is required, the remainder of its surfaces being imperforate. The operation is also appreciably smoother than any other devices for this purpose.

I claim:

1. A control rod assembly, comprising the combination of a cylindrical control rod having a slot extending longitudinally in one side thereof, said slot being laterally enlarged at intervals to provide detent receiving sockets between which the inwardly curving margins of the slot form elongated detent supporting trackways, a detent having a portion continuously engaged in said slot and another portion having a diameter greater than the width of the slot between the sockets and sufficiently less than the internal diameter of the rod to allow it to enter a socket when in registry therewith, and means, associated with the rod, for moving the enlarged portion of the detent out of the socket in which it is engaged to permit longitudinal readjustments of said rod, the reduced portion of the detent being adapted to prevent rotative displacement of the rod when the detent is not engaged in one of said sockets.

2. A control rod assembly, comprising the combination with a hollow control rod having a slot in one side thereof, laterally enlarged at predetermined intervals to provide detent receiving sockets determinative of the operating positions of said rod, a detent having a rod guiding portion permanently engaged in said slot, and a locking portion engageable in the respective sockets when in registry therewith, said locking portion being adapted to bear upon the margins of the slot between the sockets when out of socket engagement, and a detent adjusting cam slide within the rod having elongated cam portions upon which the reduced inner end portion of the detent may ride, and intervening portions of less diameter adapted to allow the detent to move to locking position when in registry with one of the sockets.

3. A control rod assembly, comprising the combination with a tubular control rod having a longitudinally extending slot, laterally enlarged to provide detent receiving sockets at spaced intervals predetermined in length by the locking requirements of said rod, a detent having a rod guiding portion permanently engaged in said slot and a locking portion formed to ride upon a slot margin between the sockets and engageable in the respective sockets when in registry therewith, and a detent actuating cam within the rod having elongated detent supporting portions upon which said permanently engaged portion of the detent may ride and another portion hollowed out to allow the detent to enter a socket with which it is in registry.

4. A control rod assembly, comprising the combination with a cylindrical control rod having a longitudinally extending slot, laterally enlarged to provide detent receiving sockets at spaced intervals predetermined in length by the locking requirements of said rod, a detent having a rod guiding portion permanently engaged in said slot and a locking portion formed to ride upon a slot margin between the sockets and engageable in the respective sockets when in registry therewith, and a detent actuating cam having elongated detent supporting portions upon which said permanently engaged portion of the detent may ride and other portions reduced to allow the detent to enter a socket with which it is in registry, said detent actuating cam having inclined surfaces at the ends of the elongated portions adapted to actuate the detent from a locking to an unlocking position preparatory to a readjustment of the control rod.

ROBERT K. WINNING.